July 3, 1928.
F. M. TIPIL
1,676,119
FISH LINE HOLDER
Filed May 26, 1927
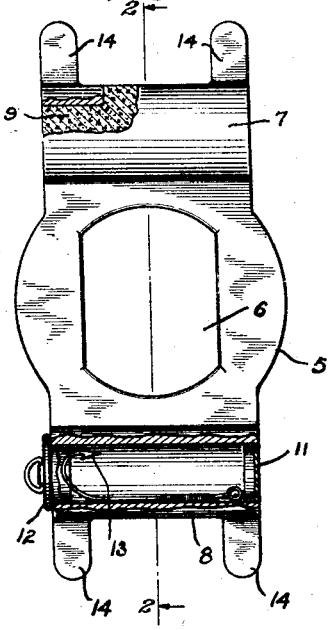
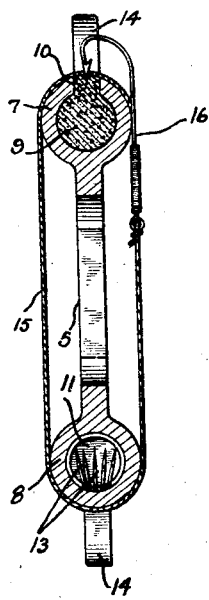
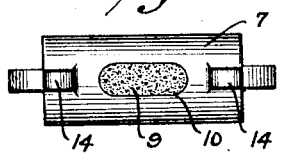
INVENTOR.
Frank M. Tipil.
BY
Morsell, Keeney & Morsell,
ATTORNEYS.

Patented July 3, 1928.

1,676,119

UNITED STATES PATENT OFFICE.

FRANK M. TIPIL, OF MILWAUKEE, WISCONSIN.

FISHLINE HOLDER.

Application filed May 26, 1927. Serial No. 194,366.

This invention relates to improvements in fish line holders.

It is one of the objects of the invention to provide a convenient holder about which a fish line may be wound and which will keep the line stretched and permit it to dry properly.

A further object of the invention is to provide a fish line holder of the class described having a hook engaging portion which will guard and protect the end portion of the hook carried by the end portion of a fish line.

A further object of the invention is to provide a fish line holder of the class described having a compartment or container portion for the keeping of spare fish hooks.

A further object of the invention is to provide a fish line holder which is light and of a convenient form and size to handle and which may be readily kept in a fishing tackle box or kit.

A further object of the invention is to provide a fish line holder which is of very simple construction, is strong and durable, is inexpensive to manufacture, is neat and attractive in appearance, and is well adapted for the purpose described.

With the above and other objects in view the invention consists of the improved fish line holder and its parts and combinations as set forth in the claims, and all equivalents thereof.

In the accompanying drawing in which the same reference characters indicate the same parts in all of the views:

Fig. 1 is a front view of the fish line holder with parts broken away and shown in section;

Fig. 2 is a longitudinal sectional view taken on line 2—2 of Fig. 1; and

Fig. 3 is an end view.

Referring now more particularly to the drawing it will appear that the device is in the form of a rectangular frame 5 formed preferably of aluminum or other light material and having a central opening or cut out portion 6. Each end of the frame is formed with a tubular, transversely extending rounded portion 7 and 8, and one of said rounded end portions, as 7, is filled with a cylinder of cork 9 or other suitable material. An opening 10 of a substantial size is formed in a side wall of the end portion 7, exposing a portion of the cylinder 9 which extends into said opening, as shown.

The other tubular end portion 8 is closed at one end by a member 11 while the other end portion is closed by a removable cap or cover 12, whereby the portion 8 forms a convenient container or receptacle for spare fish hooks 13.

A pair of spaced apart ears 14 extend longitudinally from the sides of the tubular end portions 7 and 8 and serve to confine a line wound about the frame.

In use, one end portion of a fish line 15 may be attached to a portion of the frame and the frame will form a convenient handle when the line is extended as in trolling or other forms of fishing. When the line is not in use it should be wound about the frame as shown in Fig. 2, over the rounded end portions 7 and 8 and between the ears 14. The pointed end of the hook 16 at the outer end of the line may be projected into the cork cylinder through the opening 10 and the hook is thereby guarded and protected and the line is held taut. Due to the fact that the major portion of the line is spaced from contact with the frame and also due to the opening 6 in the frame, air will have free access to the line to dry the same.

From the foregoing description it will be seen that the improved fish line holder is of very simple and novel construction and is well adapted for the purpose set forth.

What I claim is:

1. A fish line holder consisting of a frame having a pair of opposed spool-like end portions of substantially greater thickness than the other portions of said frame and about which a line may be wound, and an insert within one of the end portions for the insertion of a hook point.

2. A fish line holder, comprising a frame having a pair of tubular, transversely extending spool-like end portions about which a line may be wound, one of said end portions forming a receptacle for auxiliary hooks, and the other end portion having a side opening, and a core within said last-mentioned end portion and filling said side opening to permit the insertion of a hook point.

3. A fish line holder, comprising a rectangular, open frame having a pair of tubular, transversely extending spool-like end portions about which a line may be wound, one of said end portions forming a receptacle for auxiliary hooks, a removable cap for said end portion, the other end portion having a side opening therein, and a core of penetratable material within said last mentioned end portion and filling said side opening to permit the insertion of a hook point.

4. A fish line holder, comprising a frame having a pair of enlarged end portions about which a line may be wound, one of said end portions being hollow and forming a receptacle for auxiliary hooks, and the other end portion having therewithin an area of soft material for the insertion of a hook point.

In testimony whereof, I affix my signature.

FRANK M. TIPIL.